US012030639B2

(12) United States Patent
Huijsing

(10) Patent No.: US 12,030,639 B2
(45) Date of Patent: Jul. 9, 2024

(54) AIRCRAFT GALLEY INSERT WITH RFID TAG FOR DATA LOGGING, CONFIGURING AND COMMISSIONING

(71) Applicant: B/E AEROSPACE, INC., Winston Salem, NC (US)

(72) Inventor: Hans Huijsing, Nieuwegein (NL)

(73) Assignee: B/E Aerospace, Inc., Winston Salem, NC (US)

( * ) Notice: Subject to any disclaimer, the term of this patent is extended or adjusted under 35 U.S.C. 154(b) by 720 days.

(21) Appl. No.: 17/129,601

(22) Filed: Dec. 21, 2020

(65) Prior Publication Data

US 2022/0194586 A1  Jun. 23, 2022

(51) Int. Cl.
| *B64D 11/04* | (2006.01) |
| *G06K 7/00* | (2006.01) |
| *G06K 19/077* | (2006.01) |
| *H01Q 1/28* | (2006.01) |

(52) U.S. Cl.
CPC ............... *B64D 11/04* (2013.01); *G06K 7/00* (2013.01); *G06K 19/07749* (2013.01); *H01Q 1/28* (2013.01)

(58) Field of Classification Search
CPC ..................................................... B64D 11/04
USPC ..................................................... 235/472.01
See application file for complete search history.

(56) References Cited

U.S. PATENT DOCUMENTS

| 8,897,951 B1* | 11/2014 | Knox ................. B64F 5/40 |
| | | 701/31.4 |
| 9,162,776 B2 | 10/2015 | Shore et al. |
| 10,798,549 B1 | 10/2020 | Reed et al. |
| 2009/0112407 A1 | 4/2009 | Kneller et al. |
| 2009/0132697 A1 | 5/2009 | Scheid et al. |
| 2011/0148664 A1 | 6/2011 | Shiomori et al. |
| 2011/0220527 A1 | 9/2011 | Baatz |
| 2018/0308037 A1 | 10/2018 | Cloyd et al. |
| 2019/0210730 A1 | 7/2019 | Riedel et al. |
| 2019/0311318 A1 | 10/2019 | Bauer et al. |
| 2020/0108932 A1 | 4/2020 | Vandewall et al. |

FOREIGN PATENT DOCUMENTS

| DE | 102011114939 B4 | 3/2015 |
| EP | 3553717 A1 | 10/2019 |
| JP | 2011225044 A | 11/2011 |
| WO | 2011047864 A2 | 4/2011 |

OTHER PUBLICATIONS

Extended European Search Report for European Patent Application No. EP21216394.3, dated Apr. 22, 2022.
European Patent Office, European Office Action dated Jun. 13, 2023 in Application No. 21216394.3.

* cited by examiner

*Primary Examiner* — Rafferty D Kelly
(74) *Attorney, Agent, or Firm* — SNELL & WILMER L.L.P.

(57) ABSTRACT

A data transfer system is disclosed for a galley insert used in an aircraft, which includes an electronic interface having an integrated antenna configured to utilize a wireless communication protocol to add data relating to insert status into a message reported to a maintenance engineer by way of a wireless reader.

13 Claims, 3 Drawing Sheets

AIRCRAFT GALLEY INSERT WITH RFID TAG FOR DATA LOGGING, CONFIGURING AND COMMISSIONING

BACKGROUND OF THE INVENTION

1. Field of the Invention

The subject invention is directed to a galley insert, and more particularly, to an oven insert for use in an aircraft galley that employs an RFID tag for data logging, as well as for configuring and commissioning the insert upon installation on the aircraft.

2. Description of Related Art

Hot meals on board passenger aircraft are typically prepared in oven inserts installed in the galleys of the aircraft. These oven inserts can use steam, convection or induction for cooking meals. Currently, ovens installed in the galley of an aircraft include an RFID tag or chip that stores static historical data programmed during production or repair, which can be reported to a maintenance engineer when the chip is activated by an RFID scanner or reader.

However, current RFID tags are not configured to store log data, such as usage logs and error logs, which would be useful to maintenance engineers. It would be beneficial therefore, to replace the current RFID tags used in galley inserts with a data transfer system that can log usage and error data and report that data to maintenance engineers by way of current RFID readers or scanners.

It would also be beneficial to provide a data transfer system for galley inserts that can be used to configure and commission the insert upon installation in an aircraft, through a secure wireless interface.

SUMMARY OF THE DISCLOSURE

The subject invention is directed to a new and useful data transfer system for a galley insert used in an aircraft. The system includes an electronic interface having an integrated antenna configured to utilize a wireless communication protocol to add data relating to insert status into a message reported to a maintenance engineer by way of a wireless reader or scanner.

It is envisioned that data transfer system of the subject invention would be particularly useful when deployed in an oven insert. However those skilled in the art will readily appreciate that the data transfer system of the subject invention can be utilized in a variety of different aircraft galley inserts used in food and beverage preparation, including for example, water heaters, beverage chillers, espresso machines and other similar appliances.

Preferably, the electronic interface is configured as a Human Machine Interface (HMI) or more generally as control electronics. The antenna of the data transfer system is embedded in a Printed Circuit Board (PCB), and the PCB is located in a housing portion of the galley insert, for example, in a front upper housing portion of the insert. The wireless communication protocol is a Radio-Frequency Identification (RFID) protocol, for example, a Near-Field Communication (NFC) protocol, which is essentially a specialized subset or branch of the RFID protocol. It is envisioned that the data added to the message is at least one of usage log data and error log data.

In addition, the antenna is configured to communicate with a Personal Electronic Device (PED), which is adapted to download aircraft configuration information from a database to commission the insert upon installation in the aircraft and/or to update oven configuration information such as settings or the like after installation. The PED can also be adapted and configured to send error reports to facilitate oven maintenance and/or repair. The antenna is also configured to support communication between the over insert and an RFID reader during production and/or maintenance.

These and other features of the galley insert of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those having ordinary skill in the art will readily understand how to make and use the data transfer system of the subject invention without undue experimentation, preferred embodiments thereof will be described in detail herein below with reference to the figures wherein.

DETAILED DESCRIPTION OF THE PREFERRED EMBODIMENTS

Figure 1:
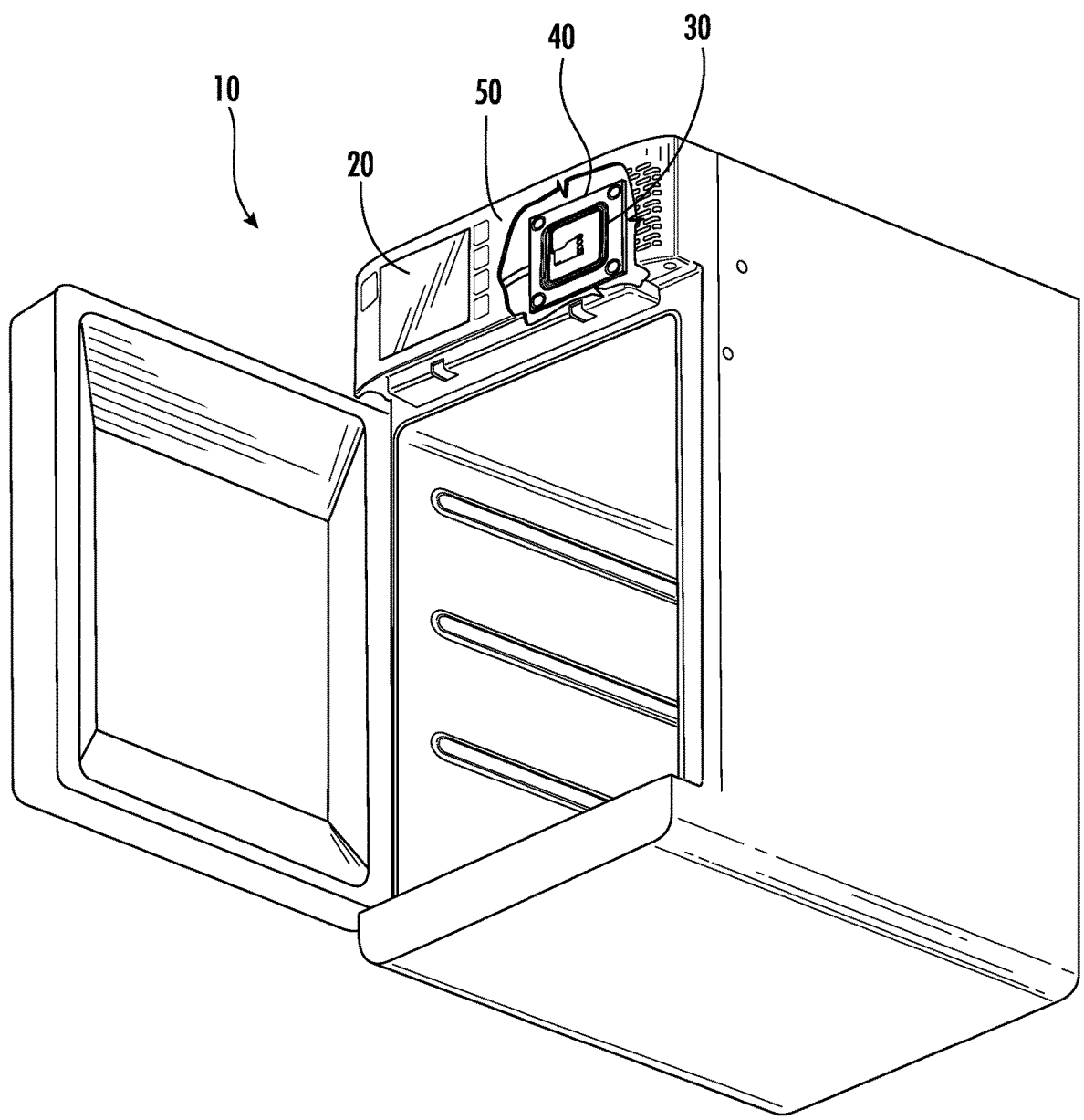
FIG. 1 is a perspective view of an oven insert that includes an antenna embedded in a PCB located in a front housing portion of the oven insert.

Referring now to the drawings wherein like reference numerals identify similar structural features or elements of the subject invention, there is illustrated in FIG. 1 an aircraft galley insert in the form of an oven 10 for use in an aircraft, which employs the new and useful data transfer system of the subject invention. The data transfer system of the subject invention includes an electronic interface 20. The electronic interface 20 can be in the form of a Human Machine Interface (HMI) or more generally as an electronic control module.

Figure 2:
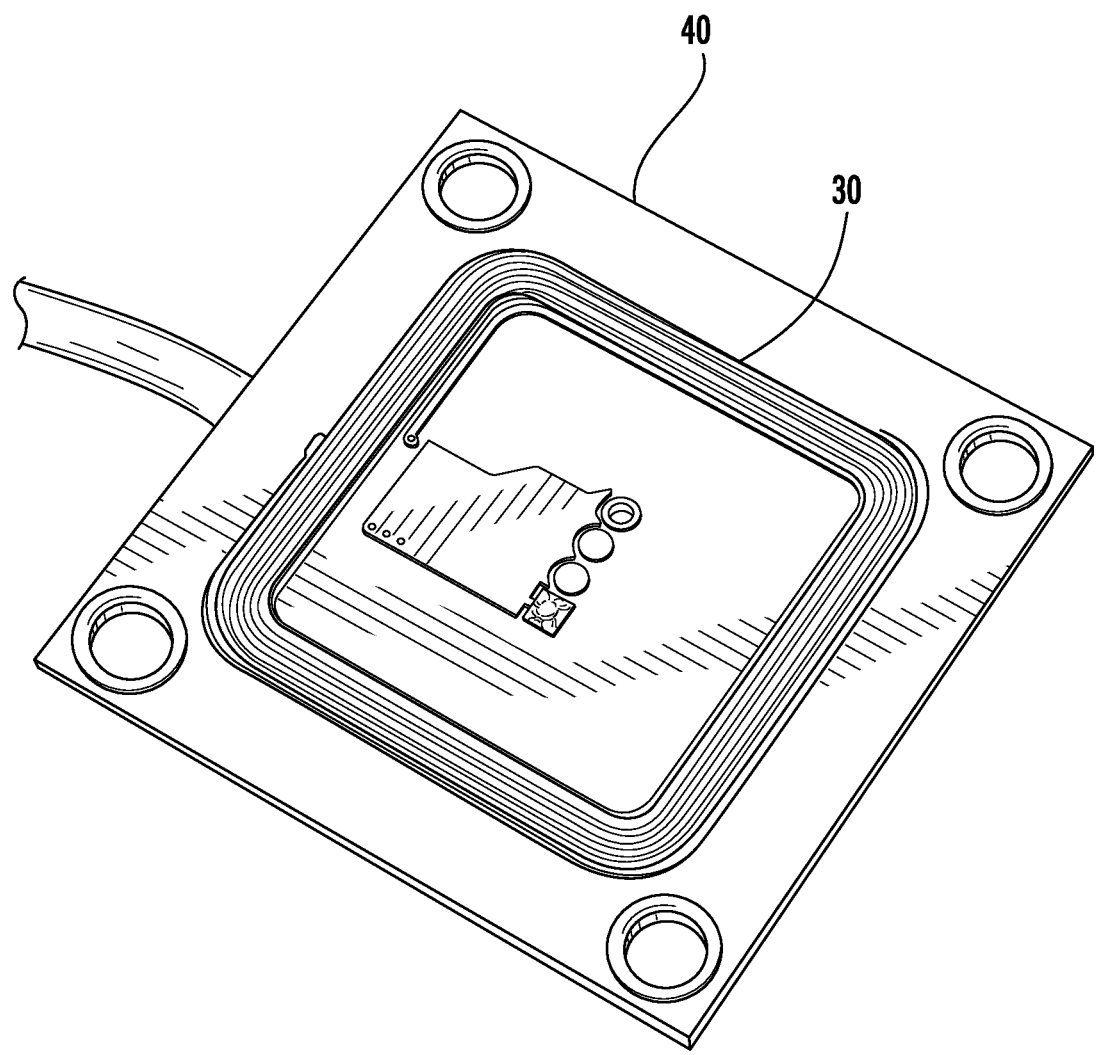
FIG. 2 is an enlarged perspective view of the PCB shown in FIG. 1, where the antenna is embedded in the PCB as a trace configuration, but which may alternatively be comprised of separate components installed onto the PCB.

The electronic interface 20 includes an integrated antenna 30 embedded in a Printed Circuit Board (PCB) 40, which is best seen in FIG. 2. Alternatively, antenna 30 could be comprised of separate components that are installed on the PCB 40. As shown in FIG. 1, the PCB 40 is located in a front housing portion 50 of the oven insert 10. However, those skilled the art will readily appreciate that the PCB 40 could be located elsewhere in the oven insert 10.

Figure 3:
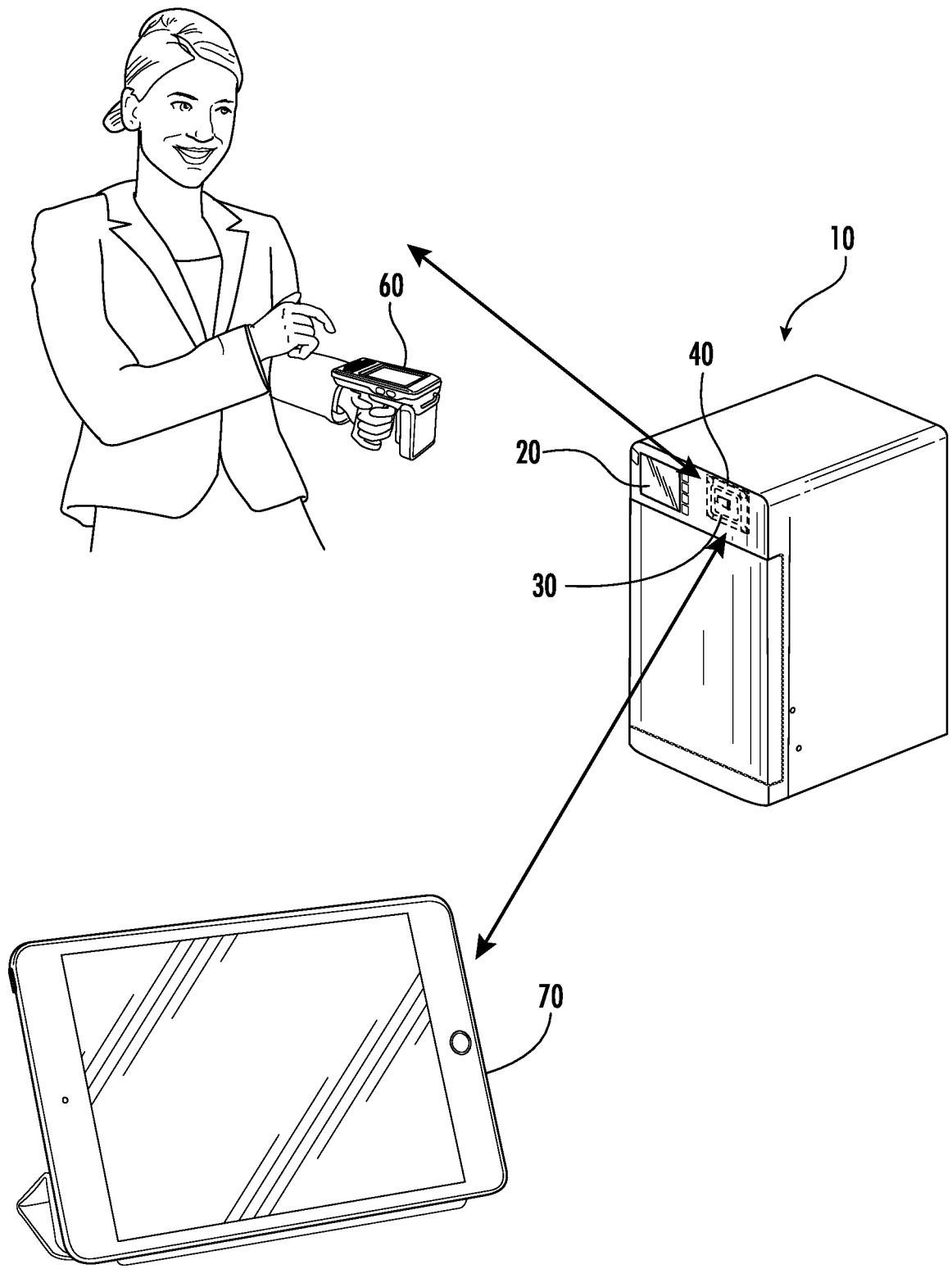
FIG. 3 is an illustration of an oven insert that employs the data transfer system of the subject invention, wherein the system is in wireless communication with a handheld RFID reader to report usage log data and/or error log data, and wherein the system is in wireless communication with a PED to configure and commission the oven insert over a secure network.

The antenna 30 is configured to utilize a wireless communication protocol to add dynamic log data relating to insert status into a message reported to a maintenance engineer by way of a handheld or otherwise portable wireless reader or scanner 60, as illustrated schematically in FIG. 3.

It is envisioned that the dynamic log data added to the message could consist of oven usage data and/or error data. More particularly, the HMI would compose a tag message that would include usage log data and/or error log data. Examples of oven usage log data includes, but is not limited to, time in use, a number of cooking cycles, a number of operating hours and frequency of activation. Examples of error log data includes, but is not limited to, over temperature occurrences, over current occurrences, motor over speed occurrences and power loss occurrences.

The wireless communication protocol utilized by the electronic interface 20 to send log data through the embedded antenna 30 is a Radio-Frequency Identification (RFID) protocol, and in particular, a Near-Field Communication (NFC) protocol. Thus, the antenna 30 functions as a normally passive, RFID tag by way of the HMI.

RFID is the process by which items are uniquely identified using radio waves, and NFC is a specialized subset within the family of RFID technology. Specifically, NFC is a branch of High-Frequency RFID, and both operate at the 13.56 MHz frequency. NFC is designed to be a secure form of data exchange, and an RFID or NFC device is capable of being both a reader and a tag.

RFID tags or transponders are small devices that utilize low-power radio waves to receive, store, and transmit data to nearby readers. They can be passive or active devices. Here, the device is active. An RFID reader or scanner (e.g., the handheld reader 60) is a radio frequency transmitter and receiver that can read and write information to an RFID tag. RFID readers can be fixed or portable. Here, the reader 60 is preferably a handheld portable device.

In accordance with the subject invention, the antenna 30 of PCB 40 is configured to communicate with a Personal Electronic Device (PED), such as a properly enabled smartphone or tablet 70, as illustrated in FIG. 3. In so doing, the PED 70 can securely download aircraft specific configuration information from a central database that could be used to commission the oven insert 10 upon installation in a particular aircraft type.

In use, the oven insert 10 would be placed into a commissioning state, where it would await configuration settings. This could be done manually or it could occur automatically. In this state, the NFC would be activated and the configuration information would be securely downloaded to the PED 70 from a remote centralized database or from a database located on the aircraft itself. The PED 70 would then make a wireless connection with the oven insert 10 by way of the antenna 30 to securely configure the oven insert 10 to the specific aircraft. Once the oven insert 10 has been configured, a status LED on the front panel of the insert oven could be illuminated to provide authentication for security purposes.

This data transfer system could also be used as a way of updating oven configuration information such as settings or the like after installation in the galley of the aircraft. The antenna 30 could also be configured to support communication between the over insert and an RFID reader during production and/or maintenance. The PED 70 can also be adapted or otherwise programmed to send error reports to a maintenance engineer or to a central repair shop to facilitate or otherwise schedule oven maintenance and/or repair.

As used in the preceding specification and in the following claims, "or" should be understood to have the same meaning as "and/or". For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

While the subject disclosure has been shown and described with reference to preferred embodiments, those skilled in the art will readily appreciate that changes and/or modifications may be made thereto without departing from the scope of the subject disclosure.

For example, while the data transfer system of the subject invention is shown and described with respect to an oven insert, those skilled in the art will readily appreciate that the data transfer system of the subject invention can be utilized in a variety of different aircraft galley inserts used in food and beverage preparation, including for example, water heaters, beverage chillers, espresso machines and other similar appliances.

What is claimed is:

1. A data transfer system for communicating data between a galley insert installed in an aircraft and a Personal Electronic Device (PED), the data transfer system, comprising:
   an electronic interface operatively connected to the aircraft galley insert, the electronic interface including an integrated antenna configured to utilize a wireless communication protocol to report a message relating to insert status to a Personal Electronic device (PED) via the integrated antenna; and
   the PED configured to communicate with the electronic interface over the wireless communication protocol to receive the message of insert status from the electronic interface, and
   wherein the PED is configured and adapted to securely download aircraft configuration information from a database remote from the aircraft to commission the insert upon installation in the aircraft and/or to update galley insert information after installation of the galley insert into the aircraft.

2. The data transfer system of claim 1, wherein the galley insert is an oven insert.

3. The data transfer system of claim 1, wherein the antenna is embedded in or installed on a Printed Circuit Board (PCB).

4. The data transfer system of claim 3, wherein the PCB is located in a housing portion of the galley insert.

5. The data transfer system of claim 1, wherein the wireless communication protocol is a Radio-Frequency Identification (RFID) protocol or a Near-Field Communication (NFC) protocol.

6. The data transfer system of claim 1, wherein the data added to the message is at least one of usage log data and error log data.

7. The data transfer system of claim 1, wherein the electronic interface is configured as a Human Machine Interface (HMI).

8. An oven insert for use in an aircraft galley comprising:
   an electronic interface operatively connected to the aircraft galley insert, the electronic interface including an integrated antenna configured to utilize a wireless communication protocol to report a message relating to oven usage and errors to a Personal Electronic device (PED) via the integrated antenna; and
   the PED configured to communicate with the electronic interface over the wireless communication protocol to receive the message of oven usage and errors from the electronic interface, and wherein the PED is configured and adapted to securely download aircraft configuration information from a database remote from the aircraft to commission the insert upon installation in the aircraft and/or to update galley insert information after installation of the galley insert into the aircraft.

9. The oven insert of claim 8, wherein the antenna is embedded in or installed on a Printed Circuit Board (PCB).

10. The oven insert of claim 9, wherein the PCB is located in a housing portion of the oven insert.

11. The oven insert of claim 8, wherein the wireless communication protocol is a Radio-Frequency Identification (RFID) protocol or a Near-Field Communication (NFC) protocol.

12. The oven insert of claim 8, wherein the PED is adapted and configured to update oven configuration information in a database and/or to send error reports to facilitate oven maintenance and/or repair.

13. The oven insert of claim 8, wherein the electronic interface is configured as a Human Machine Interface (HMI).

* * * * *